United States Patent
Khire et al.

(10) Patent No.: US 12,356,108 B2
(45) Date of Patent: Jul. 8, 2025

(54) SYSTEMS AND METHODS FOR SELECTIVELY MODIFYING A VIDEO FRAME OF A VIDEO CONFERENCE MEETING

(71) Applicant: Verizon Patent and Licensing Inc., Basking Ridge, NJ (US)

(72) Inventors: Sourabh Khire, San Jose, CA (US); Nithin A. Prakash, San Jose, CA (US); Suraj Rajpal, Karnataka (IN); Brian Russ, Atlanta, GA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 465 days.

(21) Appl. No.: 17/825,757

(22) Filed: May 26, 2022

(65) Prior Publication Data
US 2023/0412758 A1   Dec. 21, 2023

(51) Int. Cl.
*H04N 5/45* (2011.01)
*G06T 7/11* (2017.01)
*H04N 7/01* (2006.01)
*H04N 7/15* (2006.01)

(52) U.S. Cl.
CPC ............. *H04N 5/45* (2013.01); *G06T 7/11* (2017.01); *H04N 7/0117* (2013.01); *H04N 7/152* (2013.01)

(58) Field of Classification Search
None
See application file for complete search history.

(56) References Cited

U.S. PATENT DOCUMENTS

| | | | |
|---|---|---|---|
| 10,972,655 B1* | 4/2021 | Ostap | H04N 7/147 |
| 2015/0109406 A1* | 4/2015 | Carlsson | H04N 19/164 |
| | | | 348/14.13 |
| 2017/0237986 A1* | 8/2017 | Choi | H04W 4/80 |
| | | | 348/14.02 |
| 2021/0058671 A1* | 2/2021 | Yu | H04N 21/440272 |
| 2022/0201052 A1* | 6/2022 | Fitzpatrick | H04N 23/951 |
| 2022/0237735 A1* | 7/2022 | Zingade | G06V 20/40 |
| 2022/0327663 A1* | 10/2022 | Al-Shedivat | H04N 21/23439 |
| 2022/0350925 A1* | 11/2022 | Alexander | G06V 20/52 |

* cited by examiner

*Primary Examiner* — Duc Nguyen
*Assistant Examiner* — Assad Mohammed

(57) ABSTRACT

An illustrative framing component of a video conference system identifies, from a plurality of pixels of a video frame, a subset of the pixels of the video frame that depict a participant of a video conference meeting in the video frame. The framing component determines whether the video frame satisfies a set of one or more modification conditions. The framing component modifies, based on the identifying the subset of the pixels and the video frame satisfying the set of one or more modification conditions, the video frame to increase a ratio of the subset of the pixels that depict the participant in the video frame to the plurality of pixels of the video frame. Corresponding methods and systems are also disclosed.

20 Claims, 12 Drawing Sheets

SYSTEMS AND METHODS FOR SELECTIVELY MODIFYING A VIDEO FRAME OF A VIDEO CONFERENCE MEETING

BACKGROUND INFORMATION

A video conference meeting may be a meeting, such as an online meeting, in which participants may use electronic devices to electronically participate from various locations. During the video conference meeting, a video conferencing application may provide bi-directional audio and video communication to electronic devices of participants to allow participants to communicate with one another in real-time. For example, each electronic device used for the video conference meeting may receive one or more video streams from the video conference application and use the video streams to display content showing the participants in the video conference meeting. In some instances, video streams of multiple participants may be presented in a single display.

Because network bandwidth and/or compute resources of an electronic device used for a video conference meeting may increase as the number of participants of the meeting increases, the electronic device may request to receive a reduced resolution of the one or more video streams. However, the reduced resolution may decrease the quality of the display of one or more remote participants, in particular, for a video conference meeting in which video streams of multiple participants are presented in a single display. This may degrade the meeting experience and/or collaboration among the participants of the video conference meeting.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF EXAMPLE EMBODIMENTS

Figure 1:
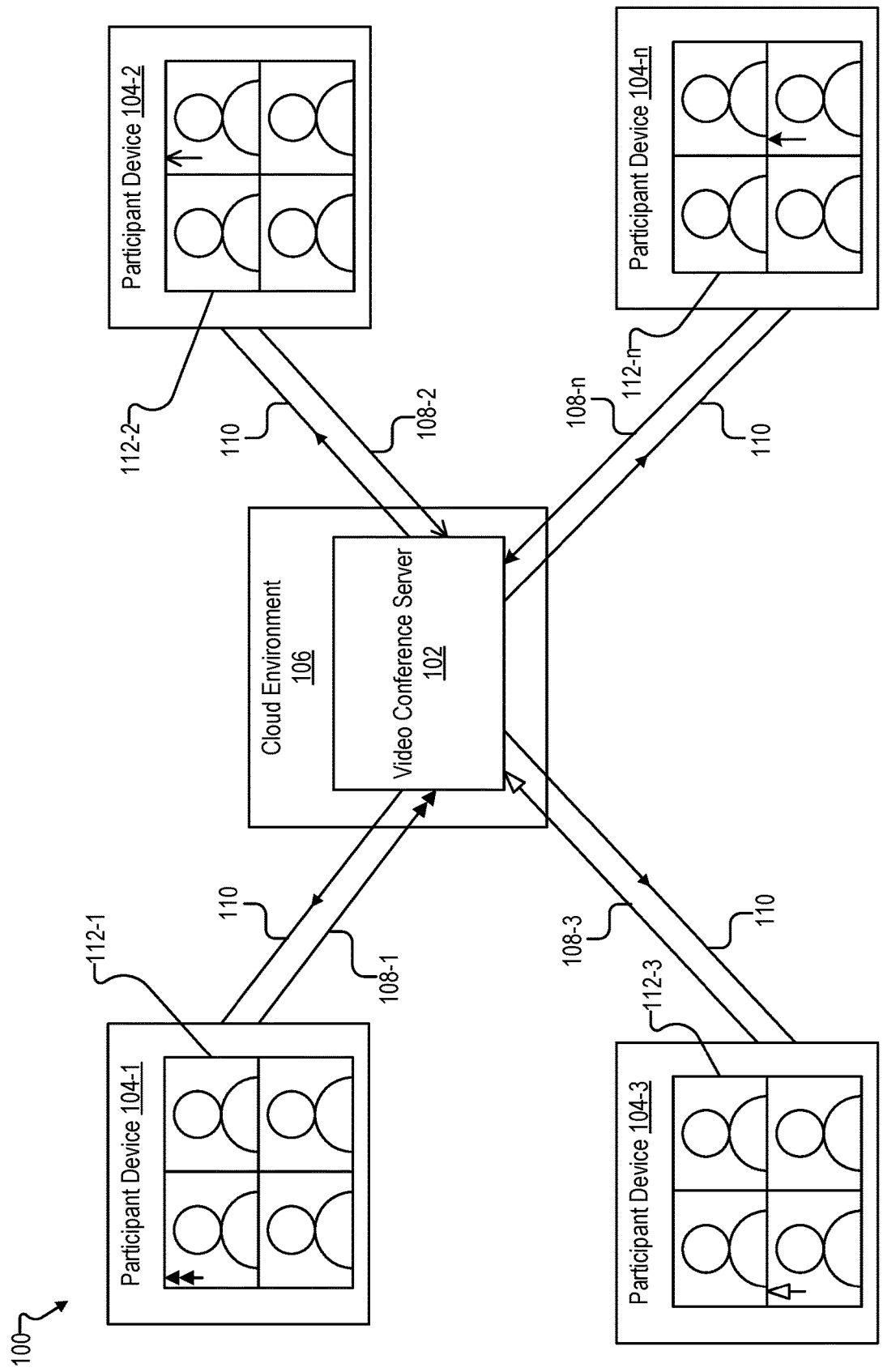
FIGS. 1 and 2 show illustrative video conferencing systems according to embodiments described herein.

Systems and methods for selectively modifying a video frame of a video conference meeting are described herein. For example, the systems and methods may selectively modify a video frame of a video conference meeting in a way that may improve presentation of video conference content depicted in the video frame. The video frame may be selectively modified based on the video frame satisfying a set of modification conditions. The set of modification conditions may be defined such that a frame modification may be applied to select video frames for which the frame modification may facilitate improved presentation in video conference meeting contexts and may not be applied to other video frames.

To illustrate, the systems and methods may identify, from a plurality of pixels of a video frame, a subset of the pixels of the video frame that depict a participant of a video conference meeting in the video frame. The video frame may include one or more video frames of a video stream comprising a plurality and/or sequence of video frames generated during the video conference meeting.

The systems and methods may determine whether the video frame satisfies a set of one or more modification conditions. Illustrative examples of modification conditions are described herein.

Based on the video frame satisfying the set of one or more modification conditions, the systems and methods may modify, based on the identified subset of pixels, the video frame to increase a ratio of the subset of the pixels that depict the participant in the video frame to the plurality of pixels of the video frame. For example, the systems and methods may crop a portion of the video frame that is outside of the subset of the pixels that depict the participant and enlarge the remaining portion of the video frame including the subset of the pixels that depict the participant. This may enlarge the view of the participant in a display of the video conference meeting.

In some embodiments, the systems and methods may determine whether a resolution of a video stream depicting a participant of a video conference meeting is less than a resolution threshold, and apply, based on the resolution being less than the resolution threshold, a frame modification to the video stream. The application of the frame modification to a video frame in the video stream may increase a ratio of pixels of the video frame that represent the participant to pixels of the video frame.

Systems and methods described herein may be advantageous in a number of technical respects. For example, as described herein, the selective modification of the video frame to increase a ratio of pixels of the video frame that represent the participant to a plurality of pixels of the video frame may allow bandwidth and/or compute resources of a device used for the video conference meeting to be used efficiently, while improving a quality of the video frame depicting a participant of a video conference meeting. For example, a video frame having a low resolution may be transmitted and/or received by a device during the video conference meeting. The use of the low resolution for the video frame may reduce an amount of bandwidth and/or compute resources consumed by the device. The modification of the video frame having the low resolution may increase a ratio of pixels of the video frame that represent the participant to pixels of the video frame, which may allow movements (e.g., facial expressions, gestures, non-verbal feedback, etc.) of the participant to be better viewed at the low resolution. This may enhance the overall meeting experience and/or collaboration of participants of the video conference meeting.

Various illustrative embodiments will now be described in detail with reference to the figures. It will be understood that the illustrative embodiments described below are provided as examples and that other examples not explicitly described herein may also be captured by the scope of the claims set forth below. Systems and methods described herein may provide any of the benefits mentioned above, as well as various additional and/or alternative benefits that will be described and/or made apparent below.

Figure 2:
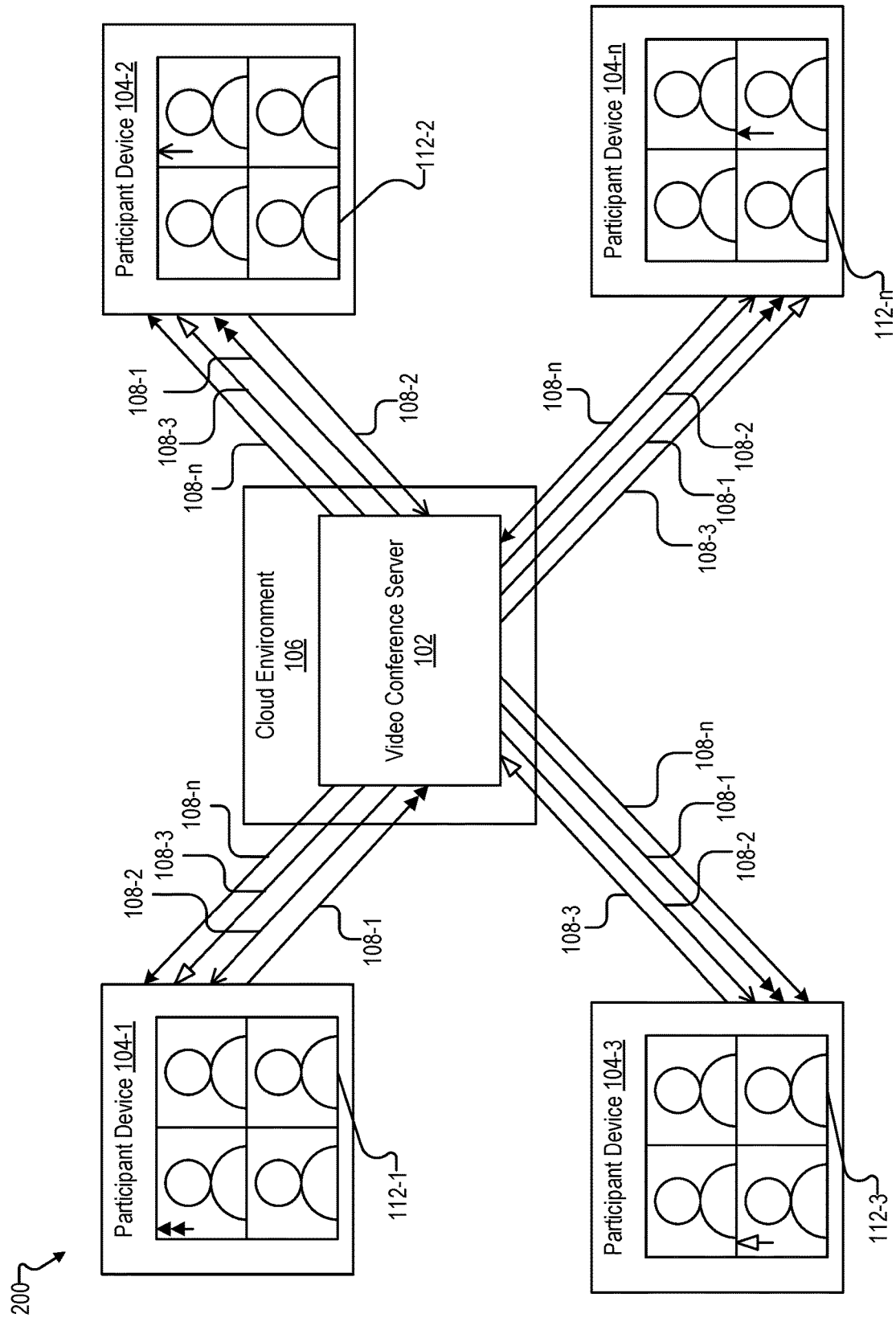

FIGS. 1 and 2 show illustrative video conferencing systems 100 and 200 that enable a video conference meeting. As depicted in FIGS. 1 and 2, video conferencing system 100 may include a video conference server 102 and a plurality of participant devices 104-1 . . . 104-n (commonly referred to herein as participant device 104).

Participant device 104 may be a computing device (e.g., a personal computer, a mobile phone, a tablet, a laptop, etc.) associated with a participant of the video conference meeting. In some embodiments, participant device 104 may implement a video conference application and the participant may operate the video conference application on participant device 104 to electronically participate in the video conference meeting. To enable two-way communication between the participant and other participants of the video conference meeting, participant device 104 may include or may be communicatively coupled to one or more user interface devices (e.g., a display screen, a camera, a microphone, an audio speaker, etc.).

In some embodiments, the user interface devices may include one or more input devices (e.g., the camera, the microphone, etc.) that are used to capture video and/or audio of the participant in real-time to generate a participant video stream of the participant. The participant video stream of the participant may then be encoded to reduce its data size and the encoded participant video stream may be transmitted to video conference server 102 and/or to participant devices 104 of other participants in the video conference meeting via a communication channel (e.g., a network connection). In some embodiments, the user interface devices may also include one or more output devices (e.g., the display screen, the audio speaker, etc.) that are used to present participant video streams of other participants in the video conference meeting to the participant. Accordingly, the participant may see and hear other participants of the video conference meeting in real-time and vice versa.

Video conference server 102 may be any suitable computing device that manages audio and video communication to and from each participant device 104 of the participants in the video conference meeting. In some embodiments, video conference server 102 may be implemented in the form of a hardware server or a virtual server that includes a processor, a memory, and network communication capabilities (e.g., a communication unit). In some embodiments, video conference server 102 may be located on-site at a physical facility of a video conference services provider, on a cloud-based system of a cloud services provider, or any combination thereof.

In the illustrated implementation, video conference server 102 is deployed in a cloud environment 106. Cloud environment 106 may include any suitable network-based computing environment as may serve a particular application. For example, cloud environment 106 may be implemented by one or more compute resources provided and/or otherwise managed by one or more cloud service providers, such as Amazon Web Services (AWS), Google Cloud Platform (GCP), Microsoft Azure, and/or any other cloud service provider configured to provide public and/or private access to network-based compute resources.

Video conferencing system 100 (system 100) depicted in FIG. 1 illustrates a Multipoint Control Unit (MCU) architecture in which video stream processing is performed by video conference server 102. As depicted in FIG. 1, participant device 104 of a participant in the video conference meeting may transmit a participant video stream depicting the participant to video conference server 102. For example, participant devices 104-1 . . . 104-n may respectively transmit participant video streams 108-1 . . . 108-n (commonly referred to herein as participant video stream 108) to video conference server 102. In some embodiments, participant video stream 108 of a participant received from a participant device 104 may be an original (e.g., uncompressed) video stream of the participant captured by the one or more user interface devices associated with the participant device 104 in real-time. Alternatively, participant video stream 108 of the participant may be encoded (e.g., compressed) to reduce network bandwidth being consumed to transmit participant video stream 108 to video conference server 102.

In some embodiments, when receiving participant video streams 108 of the participants in the video conference meeting from participant devices 104, video conference server 102 may generate a conference video stream 110 of the video conference meeting from the participant video streams 108. For example, video conference server 102 may combine the participant video streams 108 into the conference video stream 110 of the video conference meeting with each participant video stream 108 being rendered in a separate video display window. Accordingly, the conference video stream 110 may include participant video streams 108 of all participants in the video conference meeting. In some embodiments, if the participant video streams 108 are encoded, video conference server 102 may decode participant video streams 108, and generate the conference video stream 110 from the decoded participant video streams 108 in a similar manner.

In some embodiments, when the conference video stream 110 of the video conference meeting is generated, video conference server 102 may encode the conference video stream 110 and transmit encoded conference video stream 110 to all participants of the video conference meeting. In some embodiments, video conference server 102 may generate multiple encoded conference video streams 110 at different video quality levels. Each video quality level may correspond to a particular video resolution and a particular frame rate. Video conference server 102 may then selectively transmit to each participant device 104 an encoded conference video stream 110 that has a particular video quality level corresponding to a current network condition and/or a device capability associated with participant device 104. Thus, participant devices 104 of all participants in the video conference may receive the same conference video stream 110 of the video conference meeting but encoded at different video quality levels. Participant devices 104 may respectively show a display of the conference video stream 110 in a display screen 112-1 . . . 112-n (commonly referred to herein as display screen 112) of participant devices 104.

Accordingly, in video conferencing system 100 based on the MCU architecture, video stream processing is performed by video conference server 102. As described herein, video conference server 102 may generate conference video stream 110 of the video conference meeting from participant video streams 108, encode conference video stream 110, and transmit one or more encoded conference video streams 110 corresponding to one or more video quality levels (e.g., video resolutions and/or frame rates) to participant devices 104 of the participants in the video conference meeting.

Video conferencing system 200 (system 200) depicted in FIG. 2 illustrates a Selective Forwarding Unit (SFU) architecture in which video stream processing is performed by participant devices 104. As depicted in FIG. 2, participant device 104 of a participant in the video conference meeting may transmit a participant video stream capturing the participant in real-time to video conference server 102. For example, participant devices 104-1 . . . 104-*n* may respectively transmit participant video streams 108-1 . . . 108-*n* to video conference server 102. As described herein, participant video stream 108 of a participant received from a participant device 104 may be an original (e.g., uncompressed) video stream of the participant or an encoded (e.g., compressed) video stream of the participant. In some embodiments, the participant device 104 may send multiple participant video streams 108 of the participant that are encoded at different video quality levels to video conference server 102.

In some embodiments, video conference server 102 may receive participant video streams 108 of the participants in the video conference meeting from their participant devices 104. For a particular participant device 104 of a particular participant, video conference server 102 may forward participant video streams 108 of other participants in the video conference meeting to the particular participant device 104. For example, as depicted in FIG. 2, video conference server 102 may forward to participant device 104-1 participant video streams 108-2 . . . 108-*n* that are received from participant device 104-2 . . . 104-*n*. In some embodiments, a participant device 104 of a participant among the other participants may send multiple participant video streams 108 of the participant that are encoded at different video quality levels to video conference server 102 as described herein. In this case, video conference server 102 may select a participant video stream 108 of the participant that has a video quality level corresponding to a current network condition and/or a device resource capability associated with the particular participant device 104 of the particular participant, and forward the selected participant video stream 108 of the participant to the particular participant device 104.

In some embodiments, when receiving participant video streams 108 of other participants, the particular participant device 104 of the particular participant may decode participant video streams 108 of other participants (if needed), aggregate participant video streams 108 of other participants, and display participant video streams 108 of other participants to the particular participant via one or more output devices associated with the particular participant device 104. For example, participant devices 104 may respectively display the aggregated participant video streams 108 of other participants in display screens 112-1 . . . 112-*n*. Thus, the particular participant device 104 of the particular participant may transmit one or more participant video streams 108 of the particular participant corresponding to different video quality levels to video conference server 102, and receive from video conference server 102 one participant video stream 108 for each participant among the other participants of the video conference meeting.

Accordingly, in the video conferencing system 200 based on the SFU architecture, video conference server 102 may forward participant video streams 108 among participant devices 104 of the participants in the video conference meeting without processing participant video streams 108. Instead, participant video streams 108 may be processed by participant devices 104. As described herein, participant device 104 of a particular participant may encode participant video stream 108 of the particular participant, decode participant video streams 108 of other participants, and aggregate participant video streams 108 of other participants for display. In alternative implementations of video conferencing system 200, video conference server 102 may perform one or more video stream processing operations on one or more participant video streams 108 received from participant devices 104 before selecting and forwarding select ones of the video streams 108 to participate devices 104.

Figure 3A:
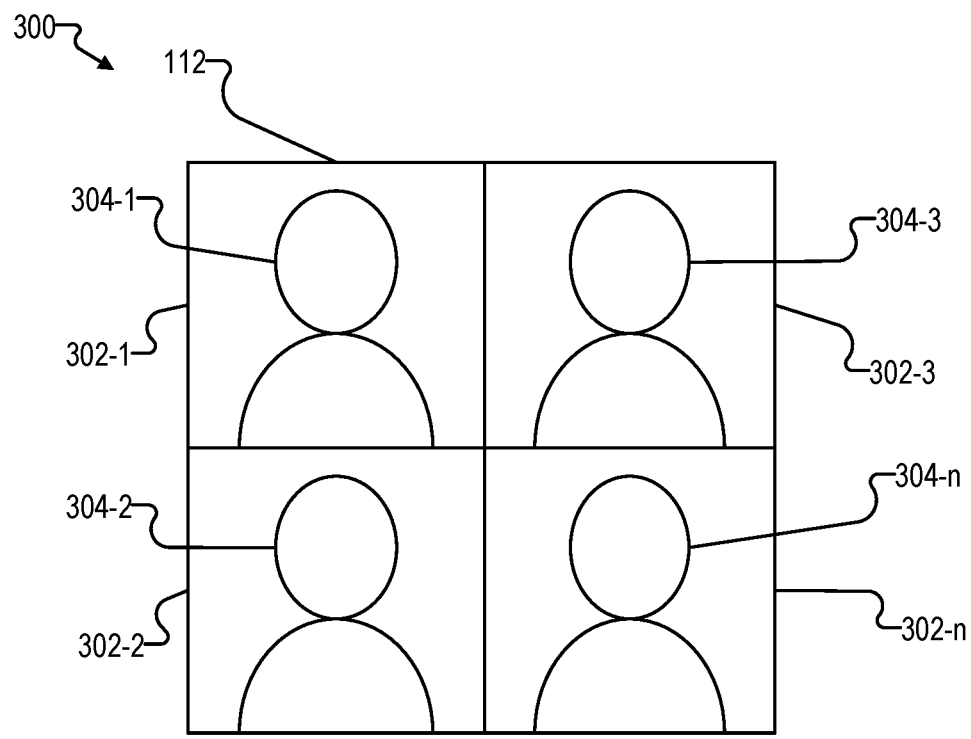
FIGS. 3A and 3B show illustrative displays of video conference meetings according to embodiments described herein.
Figure 3B:
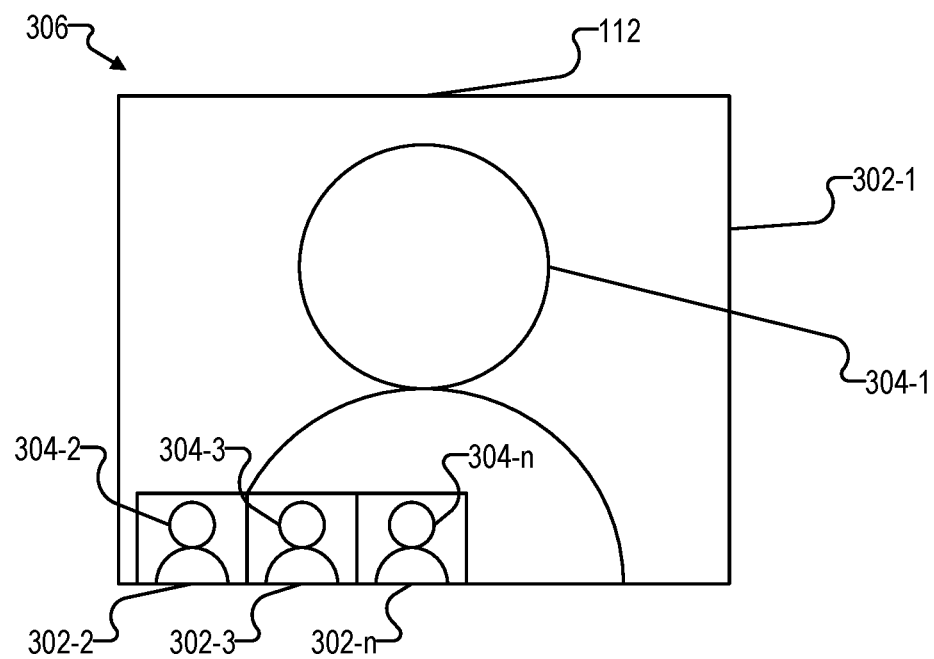

Regardless of the system architecture (e.g., MCU, SFU), participant devices 104 of the video conferencing system, such as systems 100 and 200 described herein, may be configured to display the received video streams 108 and 110. For example, FIGS. 3A and 3B show illustrative implementations 300 and 306 of a display that may be implemented by participant devices 104 in display screens 112. As shown in FIGS. 3A and 3B, implementations 300 and 306 may include a plurality of video display windows 302-1 . . . 302-*n* (commonly referred to herein as display window 302) respectively showing one or more video frames depicting participants 304-1 . . . 304-*n* (commonly referred to herein as participant 304) of the video conference meeting. For example, in some implementations, participant devices 104 may be configured to display one video frame at a time of an aggregate video stream (e.g., conference video stream 110 and/or an aggregate of participant video streams 108) that includes each participant 304 separated into display windows 302. Additionally or alternatively, participant devices 104 may be configured to concurrently display a plurality of video frames of multiple video streams (e.g., participant video streams 108) such that each display window 302 may depict a video frame from a different participant video stream 108.

Implementation 300 of a display depicted in FIG. 3A shows display windows 302 arranged in a gallery mode to separately position display windows 302 adjacent to each other in a matrix configuration. Each display window 302 may include a different participant 304 of the video conference meeting depicted in the one or more video frames. Accordingly, each display window 302 may have a video display size on display screen 112 that is less than a size of display screen 112.

Implementation 306 of a display depicted in FIG. 3B shows display windows 302 arranged in an active speaker mode such that a video display size of a first display window 302-1 is larger than a video display size of the remaining display windows 302-2 . . . 302-*n*. This may allow a first participant 304-1 that is actively speaking in the video conference meeting to be depicted in the first display window 302-1, while the remaining participants 304-2 . . . 304-*n* that are not speaking may be respectively depicted in the remaining display windows 302-2 . . . 302-*n*. In some implementations, first display window 302-1 may transition to show one of the other participants 304-2 . . . 304-*n* depending on when one of the other participants 304-2 . . . 304-*n* speak during the video conference meeting. As shown, first display window 302-1 may fill display screen 112, while the remaining display windows 302-2 . . . 302-*n* may be positioned along a portion of first display window 302-1 (e.g., the remaining display windows 302-2 . . . 302-*n* may be displayed as a thumbnail). Alternatively, the remaining display windows 302-2 . . . 302-*n* may be positioned outside of the first display window 302-1 in a portion of display screen 112. While the illustrated implementation shows the remaining display windows 302-2 . . . 302-*n* arranged in a row configuration along a bottom portion of display screen 112, the remaining display windows 302-2 . . . 302-*n* may be arranged in any suitable configuration (e.g., a matrix, a row, a column, etc.) in any portion of display screen 112 (e.g., a top, a bottom, a side, etc.).

Still other suitable implementations of displays may be implemented by participant devices 104 for displaying one or more video frames of the video conference meeting. For example, in some implementations, a display may show display windows 302 in a content sharing mode that may be similar to the active speaker mode shown in FIG. 3B, except that the first display window 302-1 may display content shared by a participant 304 of the video conference meeting instead of an active speaker. In instances where display windows 302 are in the content sharing mode, the active speaker may be included in the remaining display windows 302-2 . . . 302-*n* (e.g., as a thumbnail). Additionally or alternatively, a display may show a together mode that may depict multiple participants 304 of the video conference meeting in a single display window 302. In some implementations, a participant 304 may otherwise minimize a display of the video conference meeting in the display screen 112 (e.g., to view other images on display screen 112).

Figure 4:
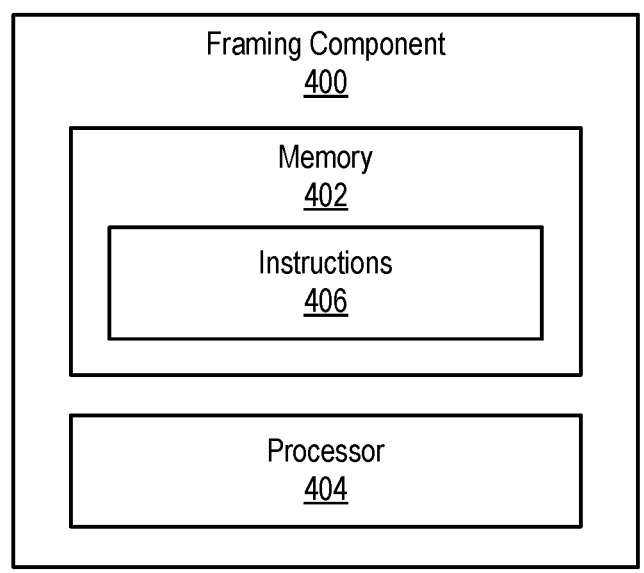
FIG. 4 shows an illustrative implementation of a framing component according to embodiments described herein.

FIG. 4 shows an illustrative framing component 400 that may be configured to selectively modify a video frame of a video stream (e.g., video streams 108 and 110) depicting a participant (e.g., participant 304) of a video conference meeting. In some examples, framing component 400 may be implemented by a video conference system, such as systems 100 and 200 described above.

Framing component 400 may be implemented by one or more computing devices and/or computer resources (e.g., processors, memory devices, storage devices, etc.) as may serve a particular implementation. As shown, framing component 400 may include, without limitation, a memory 402 and a processor 404 selectively and communicatively coupled to one another. Memory 402 and processor 404 may each include or be implemented by computer hardware that is configured to store and/or process computer software. Various other components of computer hardware and/or software not explicitly shown in FIG. 4 may also be included within framing component 400. In some examples, memory 402 and/or processor 404 may be distributed between multiple devices and/or multiple locations as may serve a particular implementation.

Memory 402 may store and/or otherwise maintain executable data used by processor 404 to perform any of the functionality described herein. For example, memory 402 may store instructions 406 that may be executed by processor 404. Memory 402 may be implemented by one or more memory or storage devices, including any memory or storage devices described herein, that are configured to store data in a transitory or non-transitory manner. Instructions 406 may be executed by processor 404 to cause framing component 400 to perform any of the functionality described herein. Instructions 406 may be implemented by any suitable application, software, code, and/or other executable data instance. Additionally, memory 402 may also maintain any other data accessed, managed, used, and/or transmitted by processor 404 in a particular implementation.

Processor 404 may be implemented by one or more computer processing devices, including general purpose processors (e.g., central processing units (CPUs), graphics processing units (GPUs), microprocessors, etc.), special purpose processors (e.g., application specific integrated circuits (ASICs), field-programmable gate arrays (FPGAs), etc.), image signal processors, or the like. Using processor 404 (e.g., when processor 404 is directed to perform operations represented by instructions 406 stored in memory 402), framing component may perform various operations as described herein.

Figure 5:
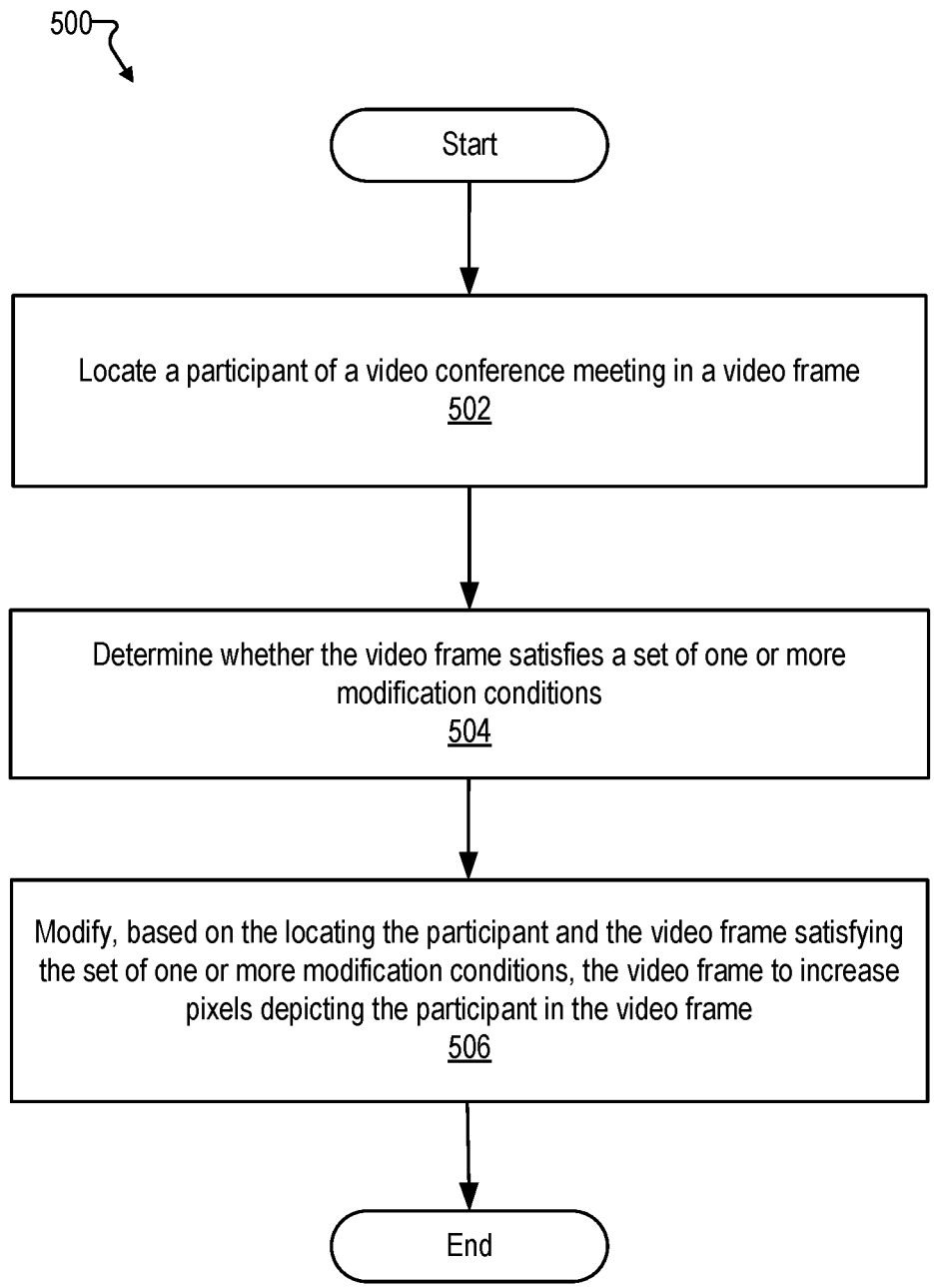
FIGS. 5 and 6 show illustrative methods of framing video content of a video conference according to embodiments described herein.

FIG. 5 shows an illustrative method 500 that may be performed by framing component 400 and/or by any implementation thereof for displaying a video conference in which one or more video frames of video streams associated with the video conference meeting may be optimally modified. While FIG. 5 shows illustrative operations according to one embodiment, other embodiments may omit, add to, reorder, and/or modify any of the operations shown in FIG. 5. In some examples, multiple operations shown in FIG. 5 or described in relation to FIG. 5 may be performed concurrently (e.g., in parallel) with one another, rather than being performed sequentially as illustrated and/or described.

At operation 502, framing component 400 may locate a participant of a video conference meeting in a video frame. For example, framing component 400 may be configured to identify a participant 304 within a video frame by implementing and applying artificial intelligence algorithms such as machine learning algorithms. Any suitable form of artificial intelligence and/or machine learning may be used, including, for example, deep learning, neural networks, etc. For example, a machine learning algorithm may be generated through machine learning procedures and applied to identification operations. In some implementations, the machine learning algorithm may be directed to identifying a participant 304 of a video conference meeting within a video frame. In some implementations, the machine learning algorithm may be configured to differentiate a face of a participant 304 relative to a body of the participant 304. The machine learning algorithm may operate as an identification function that is applied to imagery to classify participants 304 in the imagery.

Still other suitable methods may be used for identifying a participant 304 of a video conference meeting within a video frame in addition to or instead of machine learning algorithms. For example, framing component 400 may be configured to identify a participant 304 of a video conference meeting within a video frame by implementing and applying object recognition algorithms. For example, an object recognition algorithm may be used to identify objects of predetermined types (e.g., participants 304) represented in data of a video frame such as by comparing the data of the video frame to model object data of predetermined types of objects. Such model object data may be stored within a model database that may be communicatively coupled with framing component 400.

In some embodiments, the locating the participant in the video frame may include identifying, by framing component 400 and from a plurality of pixels of the video frame (e.g., an entirety of pixels of the video frame), a subset of the pixels of the video frame that depict the identified participant 304 in the video frame. The video frame may include a single video frame of a video stream (e.g., video streams 108 and 110) such that pixels depicting the participant 304 may be identified by framing component 400 at a point in time. Additionally or alternatively, the video frame may include segments of multiple video frames of a video stream (e.g., video streams 108 and 110) such that pixels depicting the participant 304 may be identified by framing component 400 over an amount of time (e.g., continuously and/or in intervals of time).

At operation 504, framing component 400 may determine whether the video frame satisfies a set of one or more modification conditions. In some embodiments, a modification condition of the set of one or more modification conditions may include whether a resolution of the video frame is less than a resolution threshold, which may indicate that the video frame has a low resolution. The resolution threshold may be represented by any suitable metric, such as a discrete value (e.g., a level, a range, a percentage, a ratio, etc.). For example, in some embodiments, the resolution threshold may include a value of less than or equal to about 360p (e.g., a resolution of about 640 pixels by about 360 pixels), less than or equal to about 180p (e.g., a resolution of about 320 pixels by about 180 pixels), and/or less than or equal to about 90p (e.g., a resolution of about 160 pixels by about 90 pixels). The resolution threshold may include any other suitable value that may indicate that a video frame having a resolution below the resolution threshold has a low resolution. In some embodiments, determining whether the video frame has a resolution below the resolution threshold may be performed by framing component 400 prior to identifying the pixels that depict the participant 304 in the video frame. For example, framing component 400 may identify pixels of a participant 304 in a video frame when the resolution of the video frame is less than the resolution threshold and refrain from identifying pixels of the participant 304 in the video frame when the resolution of the video frame is above the resolution threshold.

In some embodiments, a modification condition of the set of one or more modification conditions may include whether the resolution of the video frame is less than a resolution of another video frame. For example, a video stream (e.g., video streams 108 and 110) may be encoded by a participant device 104 and/or video conference server 102 at different video quality levels corresponding to different resolutions. Accordingly, a first video frame of a video stream may be encoded a lower resolution than a second video frame of the video stream that includes the same content. In such instances, the modification condition may be satisfied with respect to the first video frame having the lower resolution than the second video frame.

In some embodiments, a modification condition of the set of one or more modification conditions may include whether a ratio of the subset of the pixels that depict the participant 304 in the video frame to the plurality of pixels of the video frame is less than a ratio threshold, which may indicate that the participant 304 may be occupying a small portion of the video frame (e.g., the participant is positioned away from a camera capturing the participant). The ratio threshold may be represented by any suitable metric, such as a discrete value (e.g., a ratio, a level, a range, a percentage, etc.). For example, in some embodiments, the ratio threshold may include a value of less than or equal to about 1:2 (e.g., about 1 pixel of the subset of pixels to about 2 pixels of the plurality of pixels). This may indicate that participant 304 may occupy less than about 50% of the pixels of the video frame. The ratio threshold may include any other suitable value that may indicate that a participant is occupying a small portion of the video frame.

In some embodiments, a modification condition of the set of one or more modification conditions may include whether a display size of the video frame on a display screen 112 configured to display the video frame is less than a display threshold, which may indicate that the display of the video frame may be occupying a small portion of the display screen 112. For example, a display size of a display window 302 depicting the video frame may be reduced in various periods during the video conference meeting (e.g., in a gallery mode with multiple display windows 302, in an active speaker mode when the participant 304 depicted in the video frame is not speaking, in a content sharing mode, in a together mode, etc.). The display threshold may be represented by any suitable metric, such as a discrete value (e.g., a ratio, a level, a range, a percentage, etc.). As an example, in some embodiments, the display threshold may include a value of less than or equal to about 25%, which may indicate that the display size of the video frame may occupy less than about 25% of display screen 112. The display threshold may include any other suitable value that may indicate that a display size of the video frame is occupying a small portion of display screen 112.

In some embodiments, a modification condition of the set of one or more modification conditions may include whether participant 304 is a single participant in the video frame and/or display window 302. For example, framing component 400 may be configured to abstain from modifying a video frame that depicts two or more participants. This may avoid one or more participants of the video conference meeting from being cropped out of the video frame.

The modification conditions described above are illustrative such that any of the modification conditions may be omitted from the set of modification conditions. Moreover, in some embodiments, other suitable modification conditions may be included in the set of one or more modification conditions. The set of modification conditions may include only a single modification condition or may include multiple modification conditions in any defined combination of modification conditions, such as a combination of two or more of the illustrative modification conditions described herein or a combination of one or more of the illustrative modification conditions described herein with one or more additional modification conditions.

In some implementations, framing component 400 may further be configured to allow the set of one or more modification conditions to be modified by a user (e.g., a participant 304) of the video conference system. For example, a user may have access to selectively add, modify, and/or remove a modification condition from the set of modification conditions. For example, the user may be able to adjust a threshold (e.g., a resolution threshold, a ratio threshold, a display threshold, etc.) that may determine when a modification condition is satisfied.

At operation 506, framing component 400 may modify, based on the locating the participant in the video frame and the video frame satisfying the set of one or more modification conditions, the video frame to increase pixels depicting the participant in the video frame. For example, framing component 400 may modify, based on the identifying the subset of the pixels in the video frame and the video frame satisfying the set of one or more modification conditions, the video frame to increase a ratio of the subset of the pixels that depict the participant in the video frame to the plurality of pixels of the video frame. In some embodiments, the modification may include cropping or otherwise removing pixels of the video frame that do not depict the participant in the video frame and increasing the subset of pixels that depict the participant in the video frame, which may enlarge the depiction of the participant in the video frame.

The modification to the video frame may be performed when an entirety of the set of one or more modification conditions is satisfied or when a select one or more modification conditions of the set is satisfied. In some embodiments, the modification may be performed automatically when the modification conditions are satisfied. Alternatively, the modification may be performed based on a selection by a user of the video conference system. For example, the user may select when to enable the modification of the video frame and/or the user may select one or more video streams (e.g., video streams 108 and 110) received by participant device 104 for application of the modification to the video frame (e.g., the user may select to modify a video frame of a first participant video stream 108-1 and not to modify a video frame of a second participant video stream 108-2).

In some embodiments, the modification of the video frame may be applied to a single video frame of a video stream (e.g., video streams 108 and 110) such that the modification may be performed by framing component 400 at a point in time. Additionally or alternatively, the modification to the video frame may be applied to segments of multiple video frames of a video stream (e.g., video streams 108 and 110) such that the modification may be performed by framing component 400 over an amount of time (e.g., continuously and/or in intervals of time). For example, the video frame may gradually zoom in over multiple video frames to avoid a jarring movement in display window 302. In some embodiments, a resolution of the video frame may be decreased when the ratio of the subset of the pixels that depict the participant in the video frame to the plurality of pixels of the video frame is increased.

In some embodiments, method 500 may further include determining, by framing component 400 and after the modifying the video frame, whether the video frame or a subsequent video frame in the same video stream continues to satisfy the set of one or more modification conditions. If the video frame or subsequent video frame fails to continue to satisfy the set of one or more modification conditions, framing component 400 may decrease the ratio of the subset of the pixels that depict the participant in the video frame or subsequent video frame to the plurality of pixels of the video frame, which may reduce a portion of the video frame or subsequent video frame that depicts the participant. For example, it may be desirable to return the video frame or subsequent video frame to an unmodified condition in some instances (e.g., where a resolution of the video frame increases, a subset of the pixels that depict a participant 304 increases (e.g., the participant moves closer to a camera capturing the participant), a display size of the video frame increases (e.g., the participant is speaking), etc.). This may allow a background of the participant 304 to be depicted in the video frame, which may be desirable when the background includes content being shared in the video conference meeting.

In some embodiments, the decreasing the ratio of the subset of the pixels that depict the participant in a video frame to the plurality of pixels of the video frame may be performed in increments over multiple video frames of a video stream. For example, the video frame may gradually zoom out over multiple video frames to avoid a jarring movement in display window 302. In some embodiments, a resolution of the video frame may be increased when the ratio of the subset of the pixels that depict the participant in the video frame to the plurality of pixels of the video frame is decreased.

Figure 6:
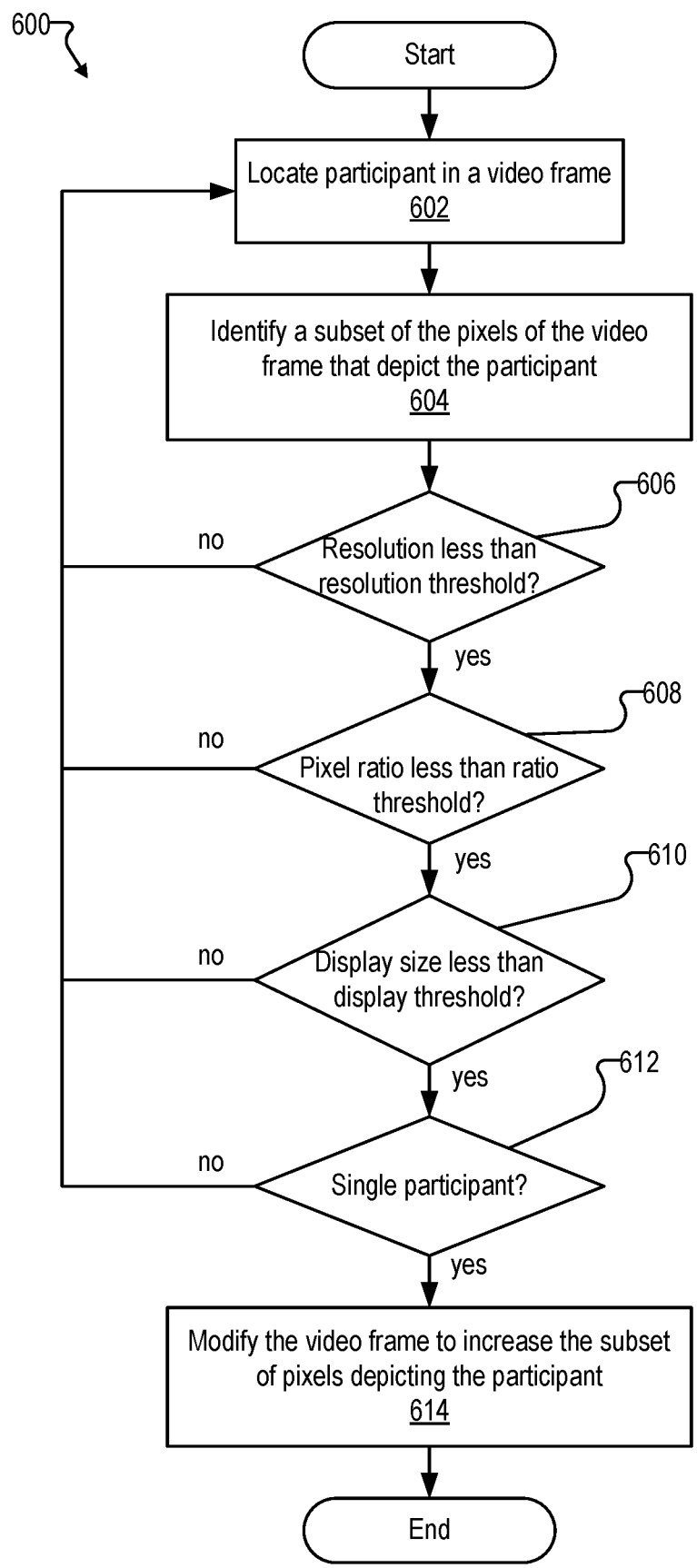

FIG. 6 shows another illustrative method 600, which may be performed by framing component 400 and/or by any implementation thereof for displaying a video conference in which one or more video frames of video streams associated with the video conference meeting may be optimally modified. While FIG. 6 shows illustrative operations according to one embodiment, other embodiments may omit, add to, reorder, and/or modify any of the operations shown in FIG. 6. In some examples, multiple operations shown in FIG. 6 or described in relation to FIG. 6 may be performed concurrently (e.g., in parallel) with one another, rather than being performed sequentially as illustrated and/or described.

Framing component 400 may, at operation 602, locate a participant 304 in a video frame and, at operation 604, identify a subset of the pixels of the video frame that depict the participant 304 as described above. Framing component 400 may further determine whether the video frame satisfies a set of one or more modification conditions.

For example, framing component 400 may, at operation 606, determine whether the video frame has a resolution that is less than a resolution threshold. If the resolution of the video frame is not less than the resolution threshold (e.g., greater than the resolution threshold, no, at operation 606), framing component 400 may refrain from modifying the video frame. In some embodiments, framing component 400 may then continue locating participant 304 in a video frame (e.g., in a subsequent video frame of the video stream). If the resolution of the video frame is less than the resolution threshold (yes, at operation 606), framing component 400 may determine whether another modification condition of the set of one or more modification conditions is satisfied until the set of modification conditions is satisfied. In some embodiments, framing component 400 may determine whether the video frame has a resolution that is less than the resolution threshold prior to locating participant 304 in the video frame. For example, if the resolution of the video frame is greater than the resolution threshold, framing component 400 may refrain from locating participant 304 and if the resolution of the video frame is less than the resolution threshold, framing component 400 may locate participant 304 in the video frame.

Framing component 400 may, at operation 608, determine whether a ratio of the subset of pixels that depict the participant in the video frame to the plurality of pixels of the video frame is less than a ratio threshold. If the ratio is not less than the ratio threshold (e.g., greater than the ratio threshold, no, at operation 608), framing component 400 may refrain from modifying the video frame and may continue locating participant 304 in a video frame. If the ratio is less than the ratio threshold (yes, at operation 608), framing component 400 may determine whether another modification condition of the set of one or more modification conditions is satisfied until the set of modification conditions is satisfied.

For example, framing component 400 may, at operation 610, determine whether a display size of the video frame is less than a display threshold. If the display size is not less than the display threshold (e.g., greater than the display threshold, no, at operation 610), framing component 400 may refrain from modifying the video frame and may continue locating participant 304 in a video frame. If the display size is less than the display threshold (yes, at operation 610), framing component 400 may determine whether another modification condition of the set of one or more modification conditions is satisfied until the set of modification conditions is satisfied.

For example, framing component 400 may, at operation 612, determine whether the video frame depicts a single participant 304 in a display window 302. If the video frame does not depict only a single participant 304 in the display window 302 (e.g., the display window depicts two or more participants, no, at operation 612), framing component 400 may refrain from modifying the video frame and may continue locating the participant 304 in a video frame. If the video frame does depict only a single participant 304 in the display window 302 (yes, at operation 612), framing component 400 may determine whether another modification condition of the set of one or more modification conditions is satisfied until the set of modification conditions is satisfied.

In the illustrated implementation, the set of modification conditions is satisfied if the video frame does depict a single participant 304 in the display window 302 (yes, at operation 612) such that framing component 400 may, at operation 614, modify the video frame to increase the subset of pixels depicting the participant.

The set of modification conditions and the order in which the modification conditions are considered in method 600 is illustrative. A different set of modification conditions and/or a different order in which the modification conditions are considered may be used in other implementations.

Figure 7A:
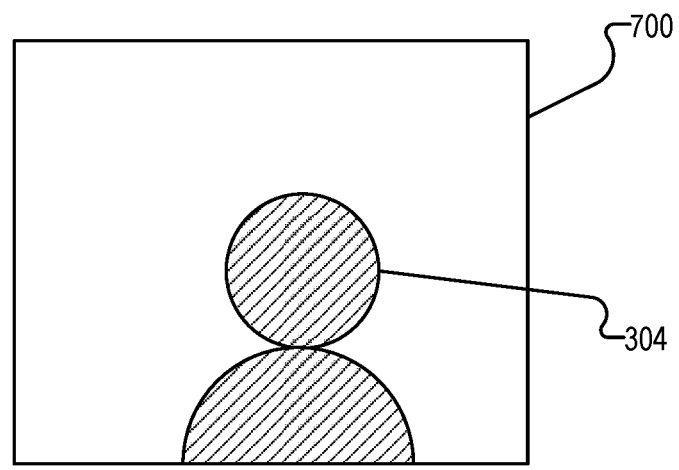
FIGS. 7A-7C show an illustrative schematic of a framing method according to embodiments described herein.
Figure 7B:
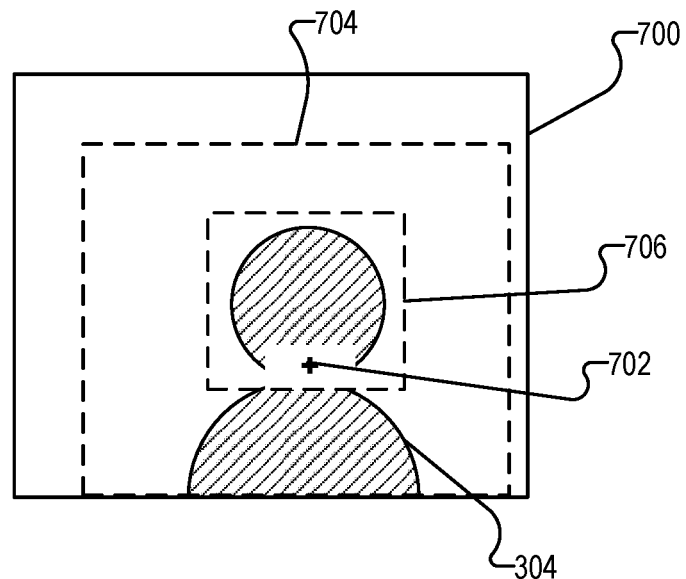
Figure 7C:
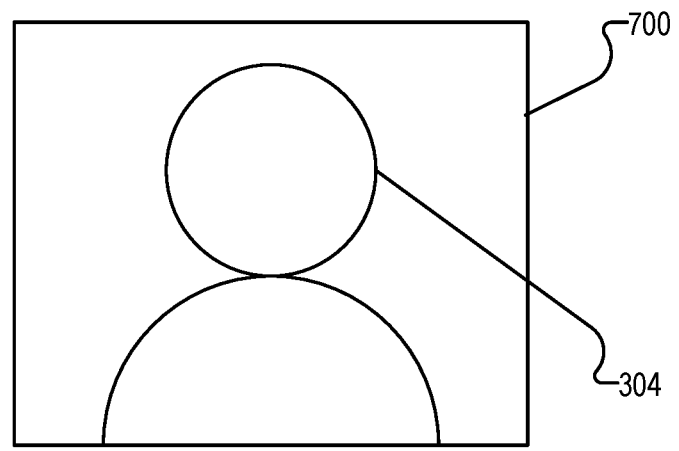

FIGS. 7A-7C show an illustrative example of modifying a display of a video frame 700 that may be implemented by framing component 400. As shown in FIG. 7A, participant 304 depicted in video frame 700 may be identified (e.g., by machine learning and/or object recognition algorithms), as shown in the shaded region of FIG. 7A. In some embodiments, once participant 304 has been identified in video frame 700, a subset of the pixels that depict participant 304 may be identified relative to the plurality of pixels of video frame 700. For example, pixels included in the shaded portion of FIG. 7A depicting participant 304 may be identified as the subset of the pixels.

As shown in FIG. 7B, the identifying the participant 304 in video frame 700 may further include determining a centroid 702 of participant 304 depicted in video frame 700 and applying, based on the centroid 702, a bounding area 704 around participant 304 within video frame 700. For example, in some embodiments, the centroid 702 may be determined based on a shape or region of video frame 700 identified (e.g., by machine learning and/or object recognition algorithms) as depicting participant 304. Bounding area 704 may be applied to video frame 700 to encompass a shape or a region of video frame 700 identified as depicting participant 304. Additionally or alternatively, the centroid 702 may be determined relative to the subset of pixels depicting participant 304 and bounding area 704 may be applied to video frame 700 such that bounding area 704 may encompass the subset of pixels depicting participant 304. In some embodiments, bounding area 704 may encompass pixels in video frame 700 in addition to the subset of pixels depicting participant 304, such as pixels that depict a border and/or a region about participant 304.

In some embodiments, bounding area 704 may be centered about the centroid 702 of participant 304 in video frame 700. Accordingly, bounding area 704 may move relative to video frame 700 as participant 304 moves within video frame 700. In some embodiments, bounding area 704 may be a fixed area (e.g., having a fixed size relative to video frame 700). Additionally or alternatively, bounding area 704 may vary in size. For example, bounding area 704 may vary in size as a size of participant 304 in video frame 700 varies (e.g., as participant 304 moves toward and/or away from a camera capturing participant 304). While bounding area 704 is shown as a box, bounding area 704 may include any suitable shape (e.g., a square, a rectangle, a circle, an outline of participant 304, etc.).

In some embodiments, an additional bounding area 706 may be included in video frame 700. The additional bounding area 706 may be implemented similar to bounding area 704, except that the additional bounding area 706 may be positioned about a face of participant 304. This may be used to distinguish a face of participant 304 relative to a body of participant 304. In some implementations, the determining whether the video frame 700 satisfies a set of one or more modification conditions may include determining whether a face of participant 304 (e.g., additional bounding area 706) depicted in the video frame 700 is entirely located within bounding area 704 (e.g., the additional bounding area 706 is less than bounding area 704) or video frame 700.

As shown in FIG. 7C, the modifying the video frame 700 may include cropping a portion of video frame 700 outside of bounding area 704 and scaling bounding area 704 to increase a size of bounding area 704 in video frame 700. This may increase the number of pixels included within bounding area 704, which may thereby increase the subset of pixels depicting participant 304. In some embodiments, as the number of pixels included within bounding area 704 increases, a number pixels depicting a border and/or region about participant 304 in bounding area 704 may increase in addition to the subset of pixels depicting participant 304. In some embodiments, bounding area 704 may be scaled to fill video frame 700. The modification of video frame 700 may enlarge the display of participant 304 (e.g., on display screen 112).

Figure 8:
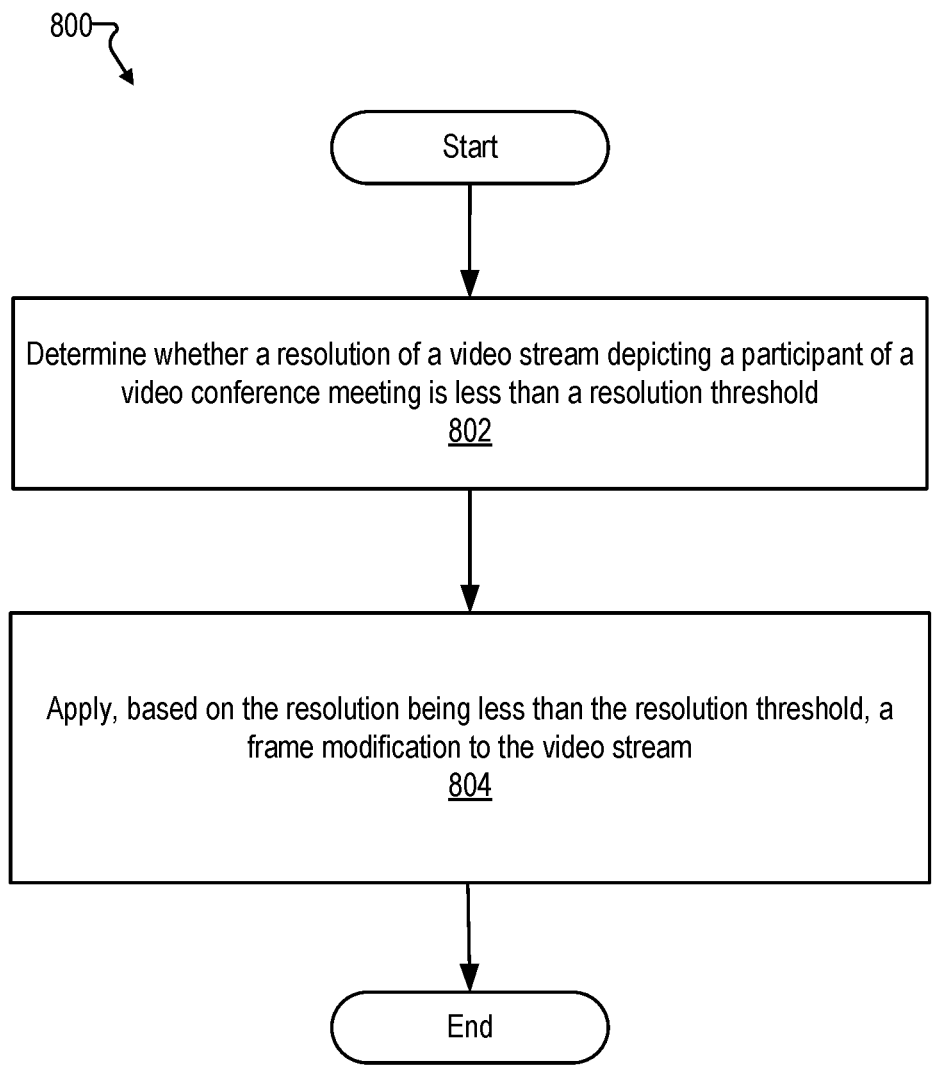
FIG. 8 shows an illustrative method of framing video content of a video conference according to embodiments described herein.

FIG. 8 shows another illustrative method 800, which may be performed by framing component 400 and/or by any implementation thereof for displaying a video conference in which one or more video frames of video streams associated with the video conference meeting may be optimally modified. While FIG. 8 shows illustrative operations according to one embodiment, other embodiments may omit, add to, reorder, and/or modify any of the operations shown in FIG. 8. In some examples, multiple operations shown in FIG. 8 or described in relation to FIG. 8 may be performed concurrently (e.g., in parallel) with one another, rather than being performed sequentially as illustrated and/or described.

At operation 802, framing component 400 may determine whether a resolution of a video stream depicting a participant of a video conference meeting is less than a resolution threshold. At operation 804, framing component 400 may apply, based on the resolution being less than the resolution threshold, a frame modification to the video stream. The frame modification increases pixels of a video frame that represent the participant in the video stream. For example, the application of the frame modification to a video frame in the video stream may increase a ratio of pixels of the video frame that represent the participant to pixels of the video frame.

In some alternative implementations of method 800, based on the resolution of the video stream being determined to be less than a resolution threshold in operation 802, operation 804 may be selectively performed based on one or more additional modification conditions being satisfied. In such alternative implementations or other alternative implementations of method 800, operations 802 and 804 may be performed at a video frame level rather than a video stream level, such as to a single video frame or to a group of video frames of a video stream.

Figure 9:
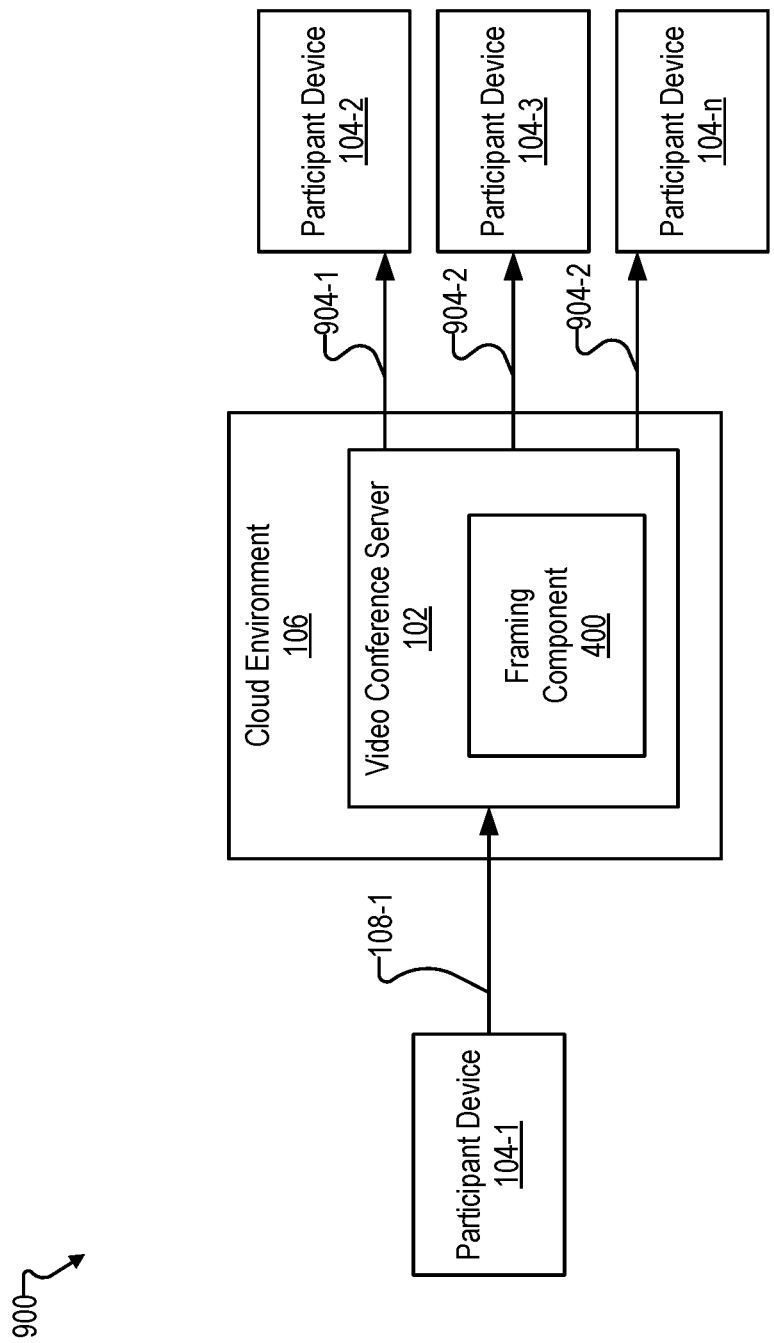
FIGS. 9-11 show illustrative implementations of a framing component according to embodiments described herein.

Framing component 400 may be implemented by various components of a video conference system (e.g., systems 100 and 200). For example, FIG. 9 shows an implementation 900 of a video conference system in which framing component 400 may be implemented by video conference server 102 in cloud environment 106 (e.g., a system having an MCU architecture). While FIG. 9 shows framing component 400 deployed in cloud environment 106 within video conference server 102, framing component 400 may additionally or alternatively be deployed in cloud environment 106 as a separate component from video conference server 102 that may be in communication with video conference server 102.

As an illustrative example, video conference server 102 may receive a first participant video stream 108-1 from a first participant device 104-1. Video conference server 102 may process first participant video stream 108-1 to generate one or more conference video streams 904-1 . . . **904-*n* (commonly referred to herein as conference video streams 904) encoded at different resolutions. Framing component 400 may be implemented, such as by video conference server 102, to selectively modify one or more of conference video streams 904. For example, a first conference video stream 904-1 may have a higher resolution than a second conference video stream 904-2. This may indicate that the set of modification conditions may be satisfied for the second conference video stream 904-2 having the lower resolution than the first conference video stream 904-1. Accordingly, framing component 400 may modify second conference video stream 904-2 to increase pixels that depict a participant in second conference video stream 904-2 and may refrain from modifying first conference video stream 904-1. Depending on the configuration of receiving participant devices 104-2 to 104-*n*, video conference server 102 may transmit the modified second conference video stream 904-2 to select participant devices 104 (e.g., participant devices 104-3 to 104-*n*) and transmit the unmodified first conference video stream 904-1 to other participant devices 104 (e.g., participant device 104-2**).

Figure 10:
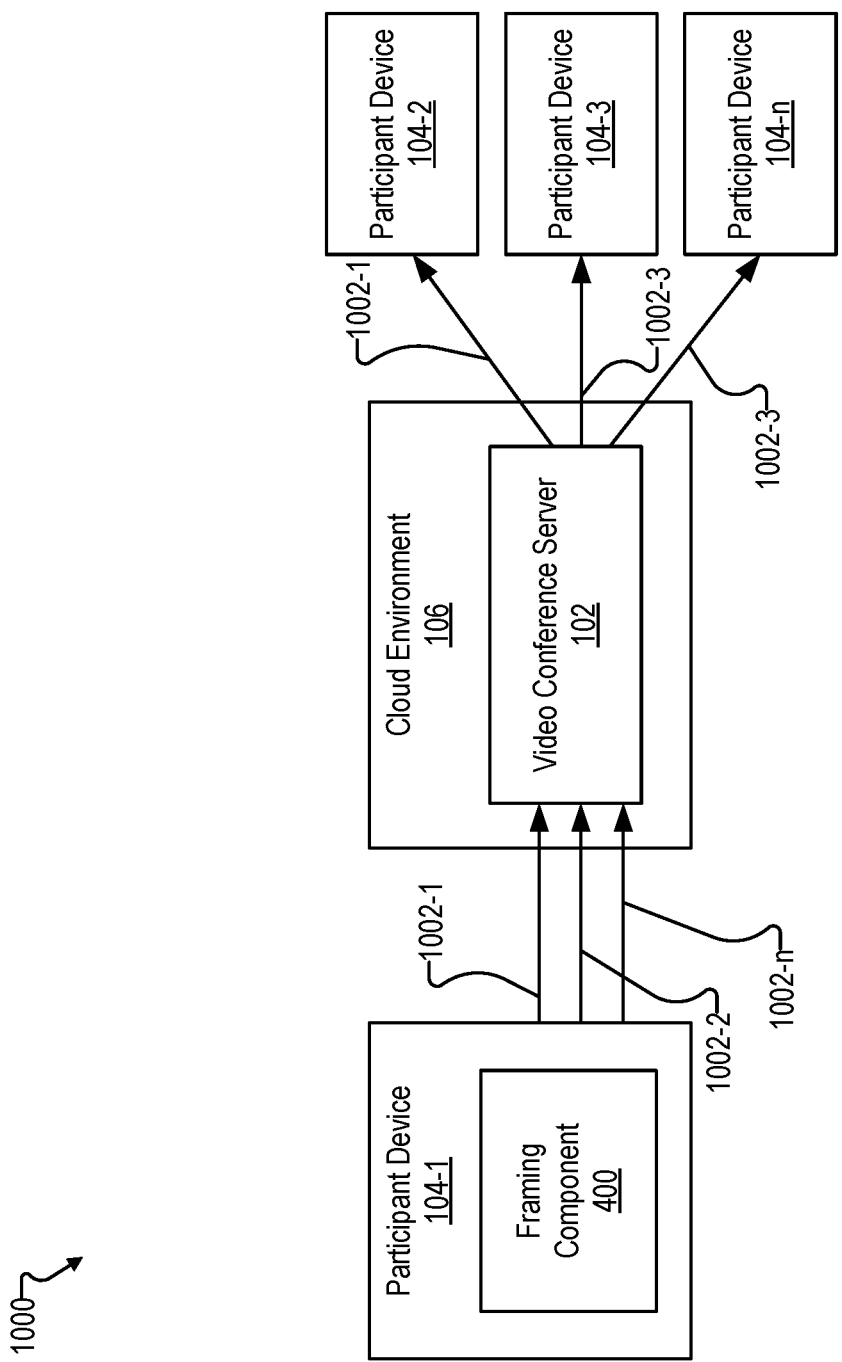
Figure 11:
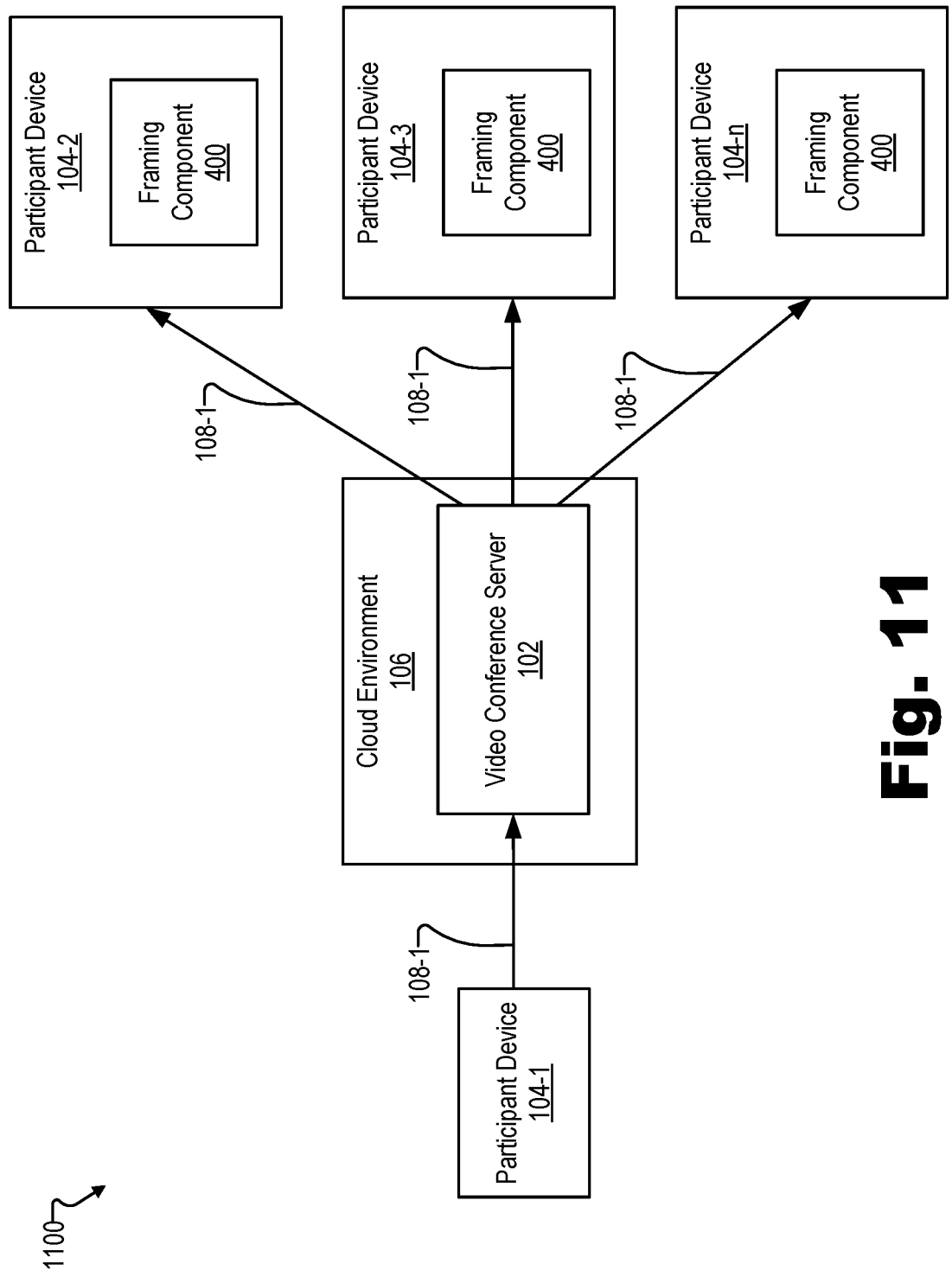

Additionally or alternatively, as shown in FIGS. 10 and 11, framing component 400 may be implemented by a participant device 104 (e.g., in a system having an SFU architecture). While FIGS. 10 and 11 show framing component 400 included within participant devices 104, framing component 400 may additionally or alternatively be a separate component from participant devices 104 that may be in communication with participant devices 104.

FIG. 10 shows an implementation 1000 of a video conference system in which framing component 400 may be implemented by a participant device 104 (e.g., first participant device 104-1) configured to send a video frame to another device. For example, first participant device 104-1 may be configured to process a participant video stream prior to transmitting the video stream to video conference server 102. To illustrate, first participant device 104-1 may generate multiple participant video streams 1002-1 to **1002-*n* (commonly referred to herein as participant video streams 1002) encoded at different resolutions. Accordingly, a first participant video stream 1002-1 may have a higher resolution than a second participant video stream 1002-2. This may indicate that the set of modification conditions may be satisfied for the second participant video stream 1002-2 having the lower resolution than the first participant video stream 1002-1 such that framing component 400 may modify the second participant video stream 1002-2 to increase a number of pixels in the second participant video stream 1002-2 that depict the participant and framing component 400 may refrain from modifying the first participant video stream 1002-1. Participant device 104-1 may then transmit the modified participant video streams 1002 (e.g., second participant video stream 1002-2) and the unmodified participant video streams 1002 (e.g., first participant video stream 1002-1) to video conference server 102, which may selectively send the video streams to receiving participant devices 104-2 to 104-*n***.

FIG. 11 shows an implementation 1100 of a video conference system in which framing component 400 may be implemented by a participant device 104 (e.g., participant devices 104-2 to **104-*n*) configured to receive a video frame from another device. For example, participant devices 104-2 to 104-*n* may be configured to receive a participant video stream 108-1 from first participant device 104-1 via video conference server 102. The receiving participant devices 104-2 to 104-*n* may be configured to process participant video stream 108-1 prior to displaying participant video stream 108-1 on a display screen 112. For example, the receiving participant devices 104-2 to 104-*n* may be configured to implement framing component 400 to modify the received participant video stream 108-1 if the received participant video stream 108-1 satisfies the set of one or more modification conditions. Alternatively, the receiving participant devices 104-2 to 104-*n* may be configured to refrain from modifying the received participant video stream 108-1 if the received participant video stream 108-1** fails to satisfy the set of one or more modification conditions.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a compact disc read-only memory ("CD-ROM"), a digital video disc ("DVD"), any other optical medium, random access memory ("RAM"), programmable read-only memory ("PROM"), electrically erasable programmable read-only memory ("EPROM"), FLASH-EEPROM, any other memory chip or cartridge, or any other tangible medium from which a computer can read.

Figure 12:
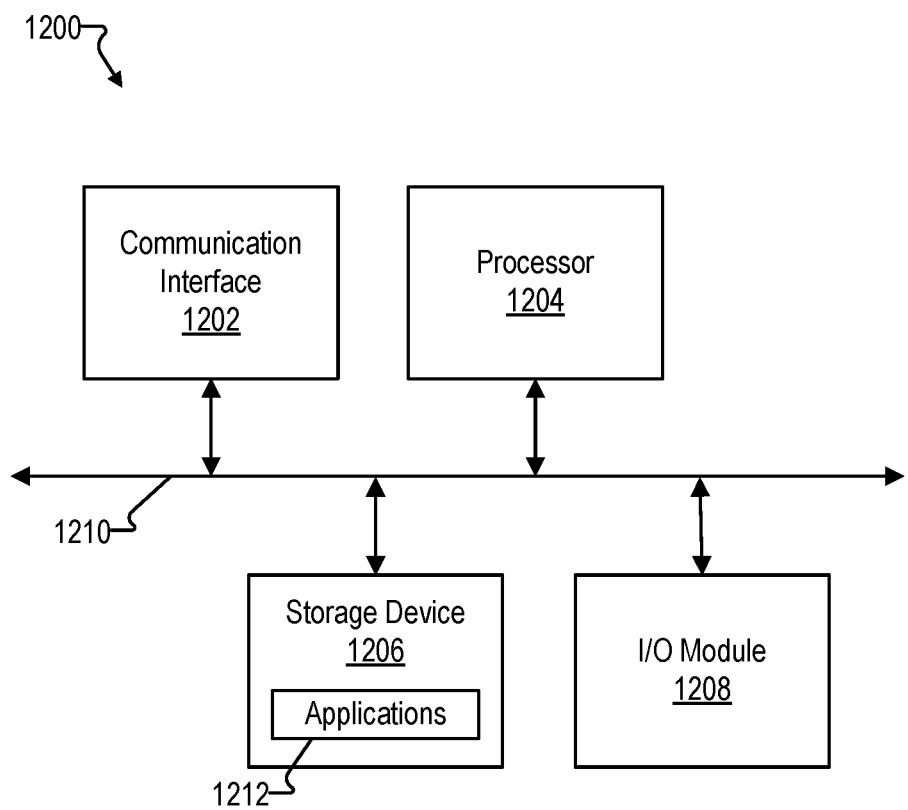
FIG. 12 shows an illustrative computing device according to embodiments described herein.

FIG. 12 shows an illustrative computing device 1200 that may be specifically configured to perform one or more of the processes described herein. For example, computing device 1200 may include or implement (or partially implement) a video conferencing system such as systems 100 and 200, a framing component 400, and/or any other computing devices described herein.

As shown in FIG. 12, computing device 1200 may include a communication interface 1202, a processor 1204, a storage device 1206, and an input/output ("I/O") module 1208 communicatively connected via a communication infrastructure 1210. While an illustrative computing device 1200 is shown in FIG. 12, the components illustrated in FIG. 12 are not intended to be limiting. Additional or alternative components may be used in other embodiments. Components of computing device 1200 shown in FIG. 12 will now be described in additional detail.

Communication interface 1202 may be configured to communicate with one or more computing devices. Examples of communication interface 1202 include, without limitation, a wired network interface (such as a network interface card), a wireless network interface (such as a wireless network interface card), a modem, an audio/video connection, and any other suitable interface.

Processor 1204 generally represents any type or form of processing unit capable of processing data or interpreting, executing, and/or directing execution of one or more of the instructions, processes, and/or operations described herein. Processor 1204 may direct execution of operations in accordance with one or more applications 1212 or other computer-executable instructions such as may be stored in storage device 1206 or another computer-readable medium.

Storage device 1206 may include one or more data storage media, devices, or configurations and may employ any type, form, and combination of data storage media and/or device. For example, storage device 1206 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 1206. For example, data representative of one or more executable applications 1212 configured to direct processor 1204 to perform any of the operations described herein may be stored within storage device 1206. In some examples, data may be arranged in one or more databases residing within storage device 1206.

I/O module 1208 may include one or more I/O modules configured to receive user input and provide user output. One or more I/O modules may be used to receive input for a single virtual experience. I/O module 1208 may include any hardware, firmware, software, or combination thereof supportive of input and output capabilities. For example, I/O module 1208 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1208 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1200. For example, one or more applications 1212 residing within storage device 1206 may be configured to direct processor 1204 to perform one or more processes or functions associated with processor 404 of framing component 400. Likewise, memory 402 of framing component 400 may be implemented by or within storage device 1206.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various illustrative embodiments have been described with reference to the accompanying drawings. It will, however, be evident that various modifications and changes may be made thereto, and additional embodiments may be implemented, without departing from the scope of the invention as set forth in the claims that follow. Certain features of one embodiment described herein may be combined with or substituted for features of another embodiment described herein. For example, any operations applied at a video frame level may also be applied at a video stream level using video stream attributes. To illustrate, a condition (e.g., a resolution, a subset of pixels depicting the participant, etc.) may be determined for one or more video frames (e.g., an interval of sequential video frames and/or every $n^{th}$ video frame) included in the video stream such that the condition of the video stream may be based on the determined condition of a select video frame and/or a combination of the one or more video frames (e.g., an average, a maximum, a minimum, a median, etc.). The description and drawings are accordingly to be regarded in an illustrative rather than a restrictive sense.

What is claimed is:

1. A method comprising:

identifying, by a framing component of a video conference system and from a plurality of pixels of a video frame, a subset of the pixels of the video frame that depict a participant of a video conference meeting in the video frame;

determining, by the framing component of the video conference system, whether the video frame satisfies a set of one or more modification conditions; and modifying, by the framing component of the video conference system and based on the identifying the subset of the pixels and the video frame satisfying the set of one or more modification conditions, the video frame to increase a ratio of the subset of the pixels that depict the participant in the video frame to the plurality of pixels of the video frame, the modifying the video frame comprising:

applying a bounding area around the participant within the video frame;

cropping a portion of the video frame outside of the bounding area to remove pixels of the video frame that do not depict the participant; and scaling the bounding area to increase a size of the bounding area in the video frame to increase the subset of the pixels that depict the participant in the video frame and enlarge a view of the participant in the video frame;

wherein the modifying the video frame to increase the ratio of the subset of the pixels that depict the participant in the video frame to the plurality of pixels of the video frame is configured to maintain or reduce a bandwidth used for the video conference meeting.

2. The method of claim 1, wherein the determining whether the video frame satisfies a set of one or more modification conditions includes determining whether a resolution of the video frame is less than a resolution threshold.

3. The method of claim 1 further comprising:
determining whether the video frame has a resolution below a resolution threshold;
wherein the identifying, the determining, and the modifying are performed based on the determining that the resolution of the video frame is below the resolution threshold.

4. The method of claim 1, wherein the determining whether the video frame satisfies a set of one or more modification conditions includes determining whether a resolution of the video frame is less than a resolution of another video frame.

5. The method of claim 1, wherein the determining whether the video frame satisfies a set of one or more modification conditions includes determining whether the ratio of the subset of the pixels that depict the participant in the video frame to the plurality of pixels of the video frame is less than a ratio threshold.

6. The method of claim 1, wherein the determining whether the video frame satisfies a set of one or more modification conditions includes determining whether a display size of the video frame on a display device configured to display the video frame is less than a display threshold.

7. The method of claim 1, wherein the determining whether the video frame satisfies a set of one or more modification conditions includes determining whether the participant is a single participant in the video frame.

8. The method of claim 1, wherein the identifying the subset of the pixels includes:
determining a centroid of the participant depicted in the video frame; and
applying, based on the centroid of the participant, the bounding area around the participant within the video frame.

9. The method of claim 8, wherein the determining whether the video frame satisfies a set of one or more modification conditions includes determining whether a face of the participant depicted in the video frame is entirely located within the bounding area.

10. The method of claim 1, wherein the set of one or more modification conditions is configured to be modified by a user of the video conference system.

11. The method of claim 1, further comprising:
determining, after the modifying the video frame, whether the video frame continues to satisfy the set of one or more modification conditions; and
decreasing, based on the video frame failing to continue to satisfy the set of one or more modification conditions, the ratio of the subset of the pixels that depict the participant in the video frame to the plurality of pixels of the video frame.

12. The method of claim 11, wherein the decreasing the ratio of the subset of the pixels that depict the participant in the video frame to the plurality of pixels of the video frame is performed in increments over multiple video frames of a video stream.

13. The method of claim 11, further comprising increasing a resolution of the video frame when the ratio of the subset of the pixels that depict the participant in the video frame to the plurality of pixels of the video frame is decreased.

14. A non-transitory computer-readable medium storing instructions that when executed by a processor causes the processor to perform the method of claim 1.

15. A method comprising:
determining, by a framing component of a video conference system, whether a resolution of a video stream depicting a participant of a video conference meeting is less than a resolution threshold; and
applying, by the framing component of the video conference system and based on the resolution being less than the resolution threshold, a frame modification to the video stream, wherein the application of the frame modification to a video frame in the video stream increases a ratio of pixels of the video frame that represent the participant to pixels of the video frame, the applying the frame modification comprising:
applying a bounding area around the participant within the video frame;
cropping a portion of the video frame outside of the bounding area to remove pixels of the video frame that do not depict the participant; and
scaling the bounding area to increase a size of the bounding area in the video frame to increase the subset of the pixels that depict the participant in the video frame and enlarge a view of the participant in the video frame;
wherein the applying the frame modification is configured to maintain or reduce a bandwidth used for the video conference meeting.

16. A system comprising:
a memory storing instructions; and
a processor communicatively coupled to the memory and configured to execute the instructions to:
identify, from a plurality of pixels of a video frame, a subset of the pixels of the video frame that depict a participant of a video conference meeting in the video frame;
determine whether the video frame satisfies a set of one or more modification conditions; and
modify, based on the identifying the subset of the pixels and the video frame satisfying the set of one or more modification conditions, the video frame to increase a ratio of the subset of the pixels that depict the participant in the video frame to the plurality of pixels of the video frame, the modifying the video frame comprising:
applying a bounding area around the participant within the video frame;
cropping a portion of the video frame outside of the bounding area to remove pixels of the video frame that do not depict the participant; and
scaling the bounding area to increase a size of the bounding area in the video frame to increase the subset of the pixels that depict the participant in the video frame and enlarge a view of the participant in the video frame;
wherein the modifying the video frame to increase the ratio of the subset of the pixels that depict the participant in the video frame to the plurality of pixels of the video frame is configured to maintain or reduce a bandwidth used for the video conference meeting.

17. The system of claim 16, wherein the processor is implemented by a computing device configured to send the video frame to another device or receive the video frame from another device.

18. The system of claim 16, wherein the processor is implemented by a computing device located in a cloud environment.

19. The method of claim 1, wherein the set of one or more modification conditions includes the video frame having a low resolution that is less than a resolution threshold, wherein the modifying the video frame to increase the ratio of the subset of the pixels that depict the participant in the video frame to the plurality of pixels of the video frame is based on the video frame having the low resolution threshold and is configured to maintain or reduce the bandwidth used for the video conference meeting at the low resolution.

20. The method of claim 1, wherein the video frame has a video quality level corresponding to a network condition or resource capability such that the modifying the video frame to increase the ratio of the subset of the pixels that depict the participant in the video frame to the plurality of pixels of the video frame is configured to maintain or reduce the video quality level of the video frame.

\* \* \* \* \*